United States Patent
Modarresi et al.

(10) Patent No.: US 11,531,927 B2
(45) Date of Patent: Dec. 20, 2022

(54) CATEGORICAL DATA TRANSFORMATION AND CLUSTERING FOR MACHINE LEARNING USING NATURAL LANGUAGE PROCESSING

(71) Applicant: Adobe Inc., San Jose, CA (US)

(72) Inventors: Kourosh Modarresi, Santa Clara, CA (US); Abdurrahman Ibn Munir, South Deerfield, MA (US)

(73) Assignee: Adobe Inc., San Jose, CA (US)

( * ) Notice: Subject to any disclaimer, the term of this patent is extended or adjusted under 35 U.S.C. 154(b) by 902 days.

(21) Appl. No.: 15/824,382

(22) Filed: Nov. 28, 2017

(65) Prior Publication Data

US 2019/0164083 A1    May 30, 2019

(51) Int. Cl.
*G06F 16/00*  (2019.01)
*G06N 20/00*  (2019.01)
*G06F 16/242*  (2019.01)
*G06F 16/28*  (2019.01)
*G06F 16/35*  (2019.01)

(52) U.S. Cl.
CPC ........... *G06N 20/00* (2019.01); *G06F 16/243* (2019.01); *G06F 16/285* (2019.01); *G06F 16/355* (2019.01)

(58) Field of Classification Search
CPC .......... G06N 20/00; G06N 3/08; G06N 7/005; G06N 5/022; G06F 16/355; G06F 16/243; G06F 16/285
USPC ........................................ 707/737, 600–899
See application file for complete search history.

(56) References Cited

U.S. PATENT DOCUMENTS

| | | | | |
|---|---|---|---|---|
| 10,318,882 B2 * | 6/2019 | Brueckner | ............. | H04L 67/10 |
| 10,728,119 B2 * | 7/2020 | Parandehgheibi | .. | H04L 41/0668 |
| 2009/0234683 A1 * | 9/2009 | Anderson | ............ | G06Q 40/025 |
| | | | | 705/30 |
| 2014/0046895 A1 * | 2/2014 | Sowani | .............. | G06Q 30/0202 |
| | | | | 707/E17.089 |
| 2014/0156567 A1 * | 6/2014 | Scholtes | .................. | G06N 5/02 |
| | | | | 706/12 |

FOREIGN PATENT DOCUMENTS

| | | | | | |
|---|---|---|---|---|---|
| CN | 102859516 A | * | 1/2013 | ....... | G06F 17/30707 |
| CN | 106570167 A | * | 4/2017 | | |
| CN | 107636678 A | * | 1/2018 | ........... | G06K 9/6223 |

* cited by examiner

*Primary Examiner* — Irete F Ehichioya
*Assistant Examiner* — Shirley D Hicks
(74) *Attorney, Agent, or Firm* — FIG. 1 Patents

(57) ABSTRACT

Categorical data transformation and clustering techniques and systems are described for machine learning using natural language processing. These techniques and systems are configured to improve operation of a computing device to support efficient and accurate use of categorical data, which is not possible using conventional techniques. In an example, categorical data is received by a computing device that includes a categorical variable having a non-numerical data type for a number of classes. The categorical data is then converted into numerical data using natural language processing. Data is then generated by the computing device that includes a plurality of latent classes. This is performed by clustering the numerical data into a number of clusters that is smaller than the number of classes in the categorical data.

20 Claims, 9 Drawing Sheets

700 

adobe data-analytics-cloud
adobe data-analytics-cloud analytics
adobe data-analytics-cloud
adobe data-analytics-cloud analytics
adobe data-analytics-cloud
adobe data-analytics-cloud
adobe data-analytics-cloud analytics
adobe data-analytics-cloud
adobe data-analytics-cloud analytics
adobe data-analytics-cloud analytics
adobe data-analytics-cloud analytics
adobe data-analytics-cloud analytics select
adobe data-analytics-cloud analytics prime
adobe data-analytics-cloud analytics ultimate
adobe data-analytics-cloud analytics video
adobe data-analytics-cloud analytics predictive-intelligence
adobe data-analytics-cloud analytics live-stream
adobe data-analytics-cloud analytics data-workbench
adobe data-analytics-cloud analytics mobile-app-analytics
adobe data-analytics-cloud analytics capabilities
adobe data-analytics-cloud analytics new-capabilities
adobe data-analytics-cloud analytics resources
adobe data-analytics-cloud analytics learn-support
adobe data-analytics-cloud analytics select
adobe data-analytics-cloud analytics prime
adobe data-analytics-cloud analytics ultimate
adobe data-analytics-cloud analytics video
adobe data-analytics-cloud analytics predictive-intelligence
adobe data-analytics-cloud analytics live-stream
adobe data-analytics-cloud analytics data-workbench
adobe data-analytics-cloud analytics mobile-app-analytics
adobe data-analytics-cloud analytics marketing-attribution
adobe data-analytics-cloud analytics analysis-workspace adobe products photoshop
adobe products illustrator
adobe products indesign
adobe products premiere
adobe products experience-design
adobe products elements-family
adobe products special-offers
adobe products photoshop
adobe products photoshop-lightroom
adobe products illustrator
adobe products premiere
adobe products indesign
adobe products experience-design
adobe products captur

Fig. 7

CATEGORICAL DATA TRANSFORMATION AND CLUSTERING FOR MACHINE LEARNING USING NATURAL LANGUAGE PROCESSING

BACKGROUND

Artificial intelligence and machine learning techniques used by a computing device employ mathematical models trained from training data to support a variety of functionality, such to generate recommendations and control output of digital marketing content. In some instances, the data employed to train and use these models by the computing device is of a mixed data type that includes both numerical (e.g., continuous) data and categorical data that is non-numerical, i.e., alphabetical. However, many machine learning techniques are typically limited to accepting numerical data as an input. Accordingly, standardization of categorical data into numerical data is a crucial step as part of training and use of models as part of machine learning.

However, conventional techniques used to perform standardization of categorical data often fail and thus hinder operation of the computing device to perform machine learning. In one conventional example, dummy variables are used for the categorical data that assume only one of two values, e.g., one and zero in which one means a subject has the value of that variable and zero indicates it does not. In practice, however, when the number of classes or categories, for any variable, are large, this may lead to the "curse of dimensionality" that may lead to misleading results when used as part of machine learning due to discovery of false patterns based on noise or random chance due to the multitude of categories included. For example, categorical data having a categorical variable of "URL of last website visited by a user" may have millions of different classes. As a result, conventional machine learning techniques could not address these categories and thus could not avail themselves of this potentially insightful information and further hindered operation of a computing device that employs these techniques.

SUMMARY

Categorical data transformation and clustering techniques and systems are described for machine learning using natural language processing. These techniques and systems are configured to improve operation of a computing device to support efficient and accurate use of categorical data, which is not possible using conventional techniques. In an example, categorical data is received by a computing device that includes a categorical variable having a non-numerical data type for a number of classes. The categorical variable, for instance, may be "last URL visited by a user" that may have millions of classes as described above. The categorical data is then converted into numerical data using natural language processing, e.g., as vector representations including n-grams. Data is then generated by the computing device that includes a plurality of latent classes. This is performed by clustering the numerical data into a number of clusters that is smaller than the number of classes in the categorical data, thereby retaining potentially valuable information yet still making it possible to process this data using machine learning. The generated data having the plurality of latent classes is then processed by a model using machine learning, such as to control output of digital content, train the model, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 depicts examples of clusters formed based on the numerical data of FIG. 6.

DETAILED DESCRIPTION

Overview

Figure 1:
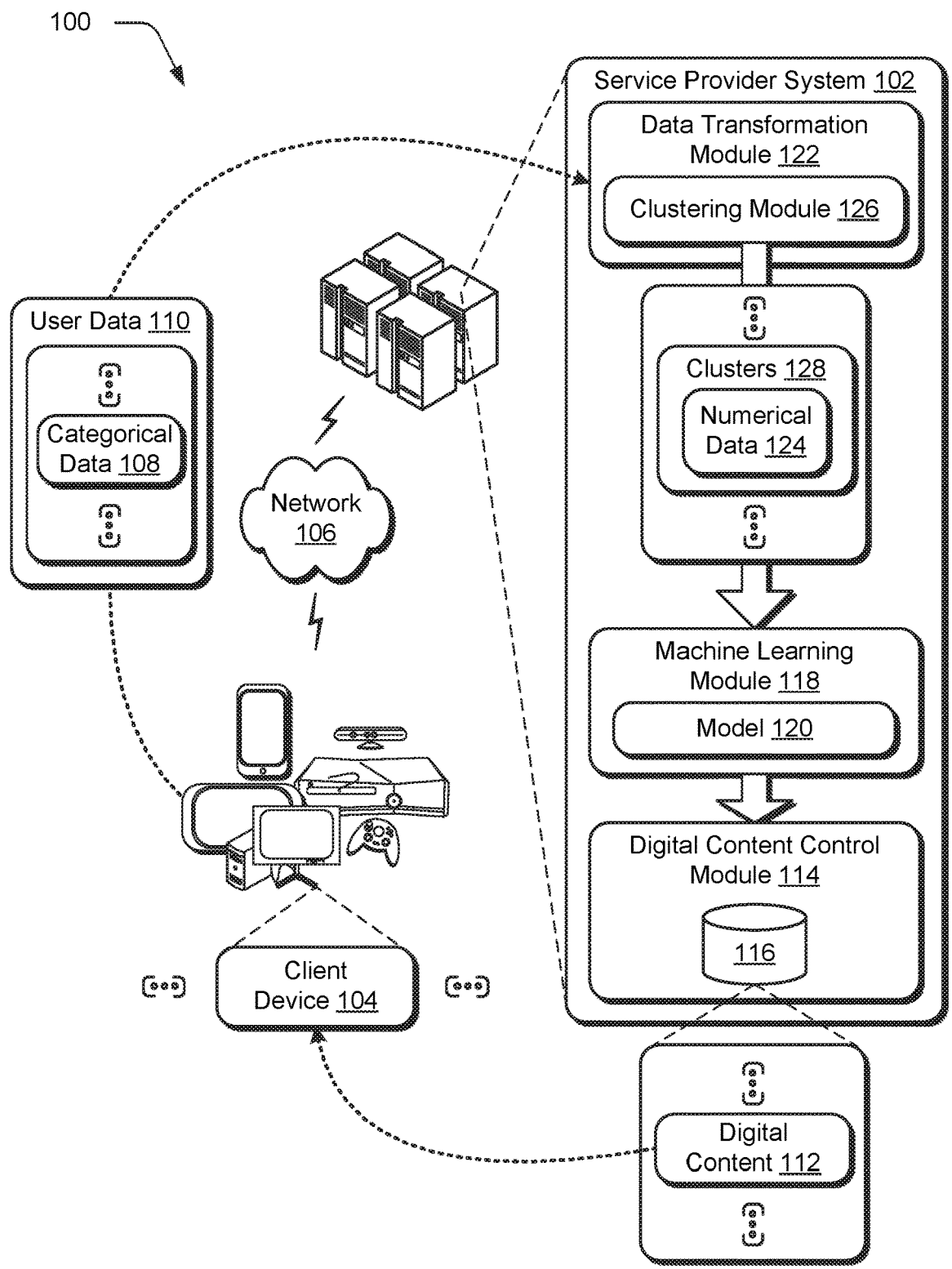
FIG. 1 is an illustration of an environment in an example implementation that is operable to employ techniques described herein.

Artificial intelligence and machine learning techniques employed by a computing device are typically limited to use of numerical data. However, in practice data may also be categorical. Categorical data is a non-numerical form of data having a categorical variable that includes multiple classes, the values of which are defined using at least some alphabetical characters. For example, a mixed data type may include numerical data such as "age" and "income" as well as categorical data such as "marital status" that is to be used as a basis to generate digital content recommendations by a computing device.

To perform machine learning, categorical data is first converted by the computing device to numerical data. Conventional techniques to do so, however, often fail due to what is referred to as the "curse of dimensionality." In order to convert a categorical variable of "marital status," for instance, there may be three classes (e.g., married, not married, divorced) and thus two new dummy variables, e.g., a "0" or "1" for married and "0" or "1" for divorced to cover the three options. Thus, in general for any categorical variable of "m" classes, "m−1" dummy variables are created in conventional techniques.

The problem arises, however, when the categorical variable includes a relatively large number of classes, which has been found in practice to be over ten. The reason is, that in this scenario the number of dummy variables that are to be created becomes too large, causing the data to become of high dimension. High dimensionality of the data leads to a "curse of dimensionality" problem resulting from an exponential increase in the number of dummy variables. This results in corresponding difficulties in distance computation based on these dummy variables (e.g., to determine similarity), thereby hindering operation of the computing device from being able to process this data using machine learning.

The curse of dimensionality, for instance, may lead to misleading results from machine learning models by finding false patterns based on noise or random chance in the categorical data. For example, consider categorical data having a large number of classes for a categorical variable such as "URL of last website visited by a user." In this example there are potentially as many classes as there are number of users, e g, millions of classes due to the billions of webpages accessible by the millions of users. Thus, conventional techniques are not able to address this data as the sheer multitude of classes hindered operation of the computing device from achieving an accurate result due to noise and possible random chance. Another difficulty resulting from high dimensionality of data is high computational cost of using any machine learning or AI models.

Accordingly, categorical data transformation techniques and systems are described for machine learning using natural language processing. These techniques and systems are configured to improve operation of a computing device to support efficient and accurate use of categorical data as part of machine learning and may do so in real time, which is not possible in conventional systems as described above.

To begin, categorical data is received by a data transformation module of a computing device. The data transformation module may first parse the categorical data to remove characters that are not useful in uniquely characterizing the categorical data, examples of which include punctuation, common text (e.g., "http" and "www" that are included in a majority of samples of the categorical data), stop words (e.g., "the"), and so forth.

The parsed categorical data is then transformed into numerical data by the data transformation module using natural language processing. The data transformation module, for instance, may generate the numerical data as vector representation of the categorical data using natural language processing, e.g., as n-gram vector representations. As previously described, this may result in a high dimensional numerical data which for the URL example may include millions of classes.

Accordingly, latent classes are then generated by the data transformation module by clustering the numerical data resulted from the data transformation module using natural language processing. Thus, the number of classes is equal to the number of clusters that is a fraction of the number of dummy variables used in the conventional techniques. This acts to reduce the number of classes, and thus dimensionality of the numerical data, to a smaller number of latent classes e.g., through K-means clustering. To carry out the K-means clustering to reduce the number of classes, the clustering method uses additional information in the form of features of the original classes to carry out the clustering procedure. In some instances, there is no information (features) available to identify the classes in the categorical data, an example of which is a URL that may include millions of classes which may be defined using any combination of characters and text. Accordingly, the numerical data generated using natural language processing above is used to generate the latent classes from clusters of the numerical data. As a result, clustering of the numerical data is based on syntactic similarity of the classes, one to another. In the case of categorical data such as URLs, for instance, this may be used to cluster semantically similar URLs having the same or similar words to form the latent classes, e.g., from the same website, references the same products or services, and so forth.

The data describing the latent classes is then provided as an input to a machine learning model to perform machine learning, e.g., to train the model or for use by a trained model to generate a result such as a recommendation or control output of digital marketing content. Thus, clustering of the numerical data generated using natural language processing acts to lower dimensionality to a smaller number of "latent classes" that are the underpinning classes of the categorical data. This acts to avoid high dimensionality and yet retain information within the categories as latent classes that is considered useful to support any machine learning technique. Examples of types of machine learning that may leverage these features include support vector machines, linear regression, logistic regression, dimensionality reduction algorithms, artificial neural networks, deep learning, Poisson regression, linear discriminant analysis (LDA), and so forth.

In this way, the natural language processing and clustering techniques described herein improve operation of a computing device to enable machine learning to be performed using categorical data. This enables the computing device to avoid operational inaccuracies of conventional techniques encountered as part of conventional techniques that are not capable of avoiding the "curse of dimensionality" that leads to potentially misleading results through detection of false patterns discovered based on noise or random chance. Further discussion of these and other examples is included in the following sections.

Term Examples

"Categorical data" includes a categorical variable having a non-numerical form that includes multiple classes, the values of which are defined using at least some alphabetical characters. "Numerical data" is expressed solely using characters, whereas categorical data may be expressed using alphabetical and numerical characters. For example, a mixed data type may include numerical data such as "age" and "income" as well as categorical data such as "marital status" that is to be used as a basis to generate digital content recommendations by a computing device.

As used herein, the term "model" as used in reference to "machine learning" refers to a computer representation that can be tuned (e.g., trained) based on inputs to approximate unknown functions. In particular, the model can include a model that utilizes algorithms to learn from, and make predictions on, known data by analyzing the known data to learn to generate outputs that reflect patterns and attributes of the known data. For instance, a model used as part of machine learning can include but is not limited to, support vector machines, linear regression, logistic regression, Bayesian networks, dimensionality reduction algorithms, artificial neural networks, deep learning, Poisson regression, linear discriminant analysis (LDA), and so forth. Thus, a model is used as part of machine learning to make high-level abstractions in data by generating data-driven predictions or decisions from the known input data.

"Real time" refers to processing of input data by a computing device within milliseconds so that the processed data is output as experienced by a user to appear as immediate feedback. "Real time distribution" involves communication of digital content in real time, e.g., transmission by a computing device for viewing by a user and/or receipt by another computing device.

"Digital content" refers to a variety of different types of digital content, such as images, video, sound, and so on. Accordingly, digital content may be created to describe a variety of visual, audio, and/or haptic characteristics, such as objects to be included in an image, general look and feel of the image, types of sounds to be included in sound, locations for capture of video, haptic feedback, and so forth.

"Digital marketing content" is typically provided to users in order to increase a likelihood that a user will interact with the content or another item of digital marketing content toward purchase of a product or service, which is also referred to as conversion. In one example of use of digital marketing content and conversion, a user may navigate through webpages of a website of a service provider. During this navigation, the user is exposed to advertisements relating to the good or service. If the advertisements are of interest to the user, the user may select the advertisement to navigate to webpages that contain more information about the product or service that is a subject of the advertisement, functionality usable to purchase the good or service, and so forth. Each of these selections thus involves conversion of interaction of the user with respective digital marketing content into other interactions with other digital marketing content and/or even purchase of the good or service. Thus, configuration of the advertisements in a manner that is likely to be of interest to the users increases the likelihood of conversion of the users regarding the product or service.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 communicatively coupled to a plurality of client devices 104 via a network 106. Computing devices that implement the service provider system 102 and client device 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 9 and shown for the service provider system 102.

In this example, categorical data 108 is illustrated as being provided by the client device 104 to the service provider system 102 via the network 106 as part of user data 110. Categorical data 108 is a type of non-numerical data that includes a categorical variable having classes that are specified at least partially using alphabetical characters to describe the classes. For a categorical variable "occupation," for instance, classes that describe potential values for the occupation category include "engineer," "lawyer," "doctor," and so forth and thus use alphabetical characters. Thus, the user data 110 in this example includes categorical data 108 that is usable to describe characteristics of users of the client device 104 and/or the client device 104, itself. Categorical data may also include numbers along with alphabetic characters, an example of which includes a rating.

This may be used, for instance, to control output of digital content 112 by a digital content control module 114 of the service provider system 102 to the client device 104. The digital content 112 is illustrated as stored in a storage device 116, e.g., a computer-readable storage medium. The digital content control module 114, for instance, may output the digital content 112 as recommendations, as digital marketing content to influence conversion of a good or service by a user of the client device 104, and so on for communication via the network 106 to the client device 104.

In order to control which items of digital content 112 are to be output to the client device 104 in this example, a machine learning module 118 employs a model 120 that is configured to process the user data 110. The machine learning module 118, for instance, may train the model 120 using training data that describes characteristics of users, digital content exposed to the users, and a result of actions taken by the users, e.g., conversion of a good or service. The model 120, as part of training, is used to predict user actions based on the training data and then compare those predictions with a result in the training data.

A loss function is then used to determine a measure of loss (i.e., a measure of difference such as a mean square error or mean absolute loss) and propagate this measure back through the model 120 (e.g., layers in a neural network) to correct parameters that caused errors in the prediction, e.g., to set different weights. In this way, the model 120 may employ the loss function to learn through processing of the training data. Once trained, the model 120 may then be used in this instance to process user data 110 to control which items of digital content 112 are to be output to the client device 104, e.g., digital marketing content, content recommendations, and so forth. Other instances are also contemplated of use of the machine learning module 118 that do not involve control of digital content 112 output.

As previously described, the machine learning module 118 and model 120 are typically configured to accept numerical data. However, in practice, categorical data 108 is often also included as part of data to be processed by the model 120, e.g., user data 110 in this example. The user data 110, for instance, may include numerical data such as "age" as well as categorical data such as "marital status." Accordingly, the service provider system 102 in this example is configured to employ a data transformation module 122 to transform the categorical data 108 into numerical data 124 that is acceptable for processing by the model 120 as part of machine learning.

However, scenarios exist in practice in which the categorical data 108 includes hundreds, thousands, and even millions of potential classes for a categorical variable, which may lead to the "curse of dimensionality" problem, when converted to numerical variables using conventional techniques, as previously described. For example, in practice it has been found that instances in which a categorical variable includes more than ten classes causes machine learning techniques to produce results that have limited accuracy and thus meaning because the number of classes is too much, and thus the number of newly created numerical dummy variables are also too large for a numerical model to handle as part of machine learning as implemented by a computing device.

To address this, the data transformation module 122 also employs a clustering module 126 to generate latent classes from the numerical data by forming clusters 128 of the numerical data 124, e.g., using K-means clustering, Silhouette model, and so forth. The clustering module 126 is thus configured to reduce a number of classes in the categorical data 108 (e.g., from more than ten to less than ten) by clustering the numerical data 124 to form a smaller number of "latent classes" that are the underpinning classes for the original categories of the categorical data 108. In this way, the high dimensionality of conventional techniques is avoided. Yet still, the latent classes formed from the clusters 128 may be used to retain information usable for processing by the machine learning module 118 in a form that is acceptable by the model 120, further discussion of which is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Categorical Data Transformation and Clustering

Figure 2:
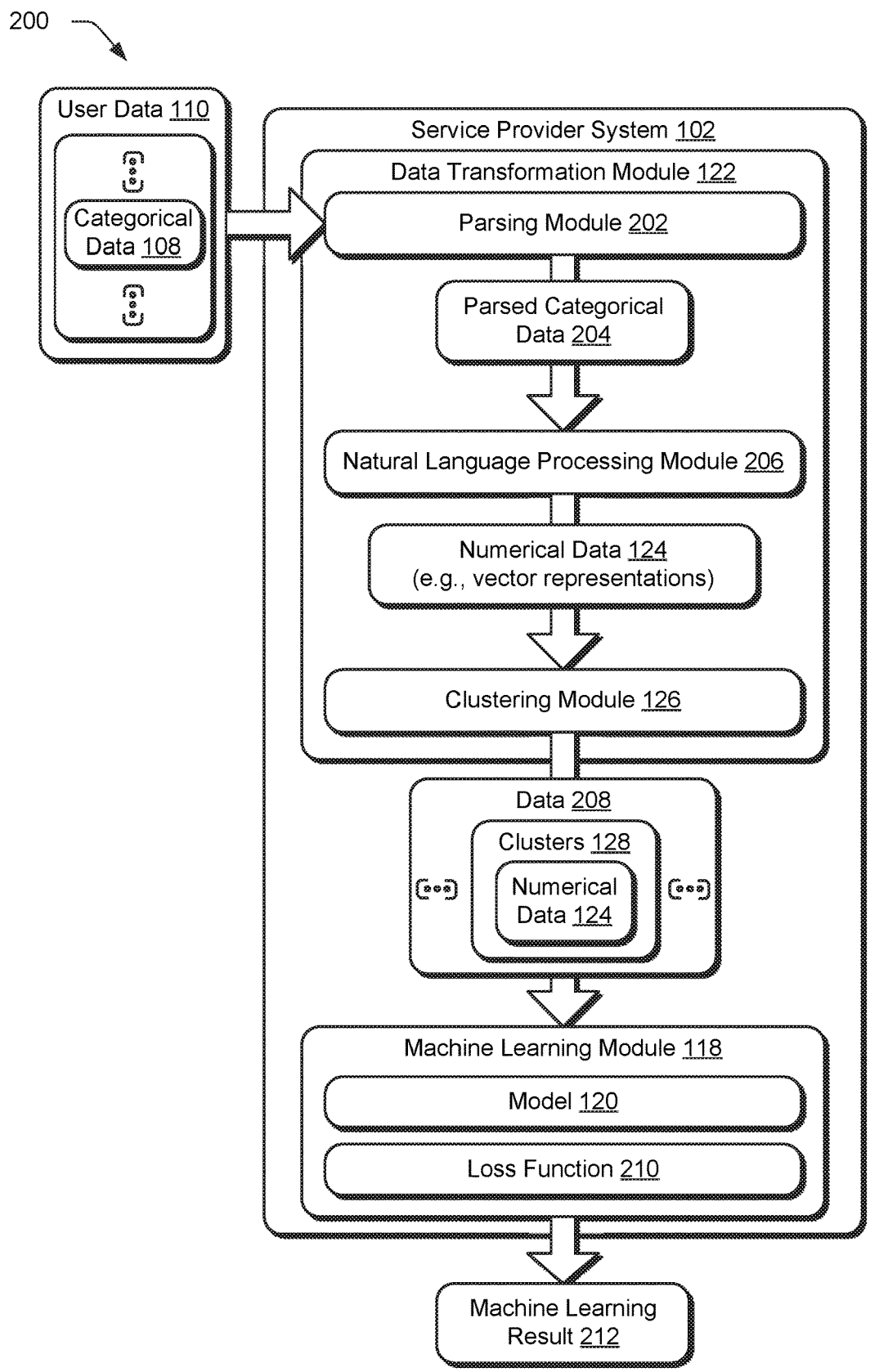
FIG. 2 depicts a system in an example implementation showing operation of a data transformation module and clustering module of FIG. 1 to process categorical data into a form that is acceptable for machine learning.
Figure 3:
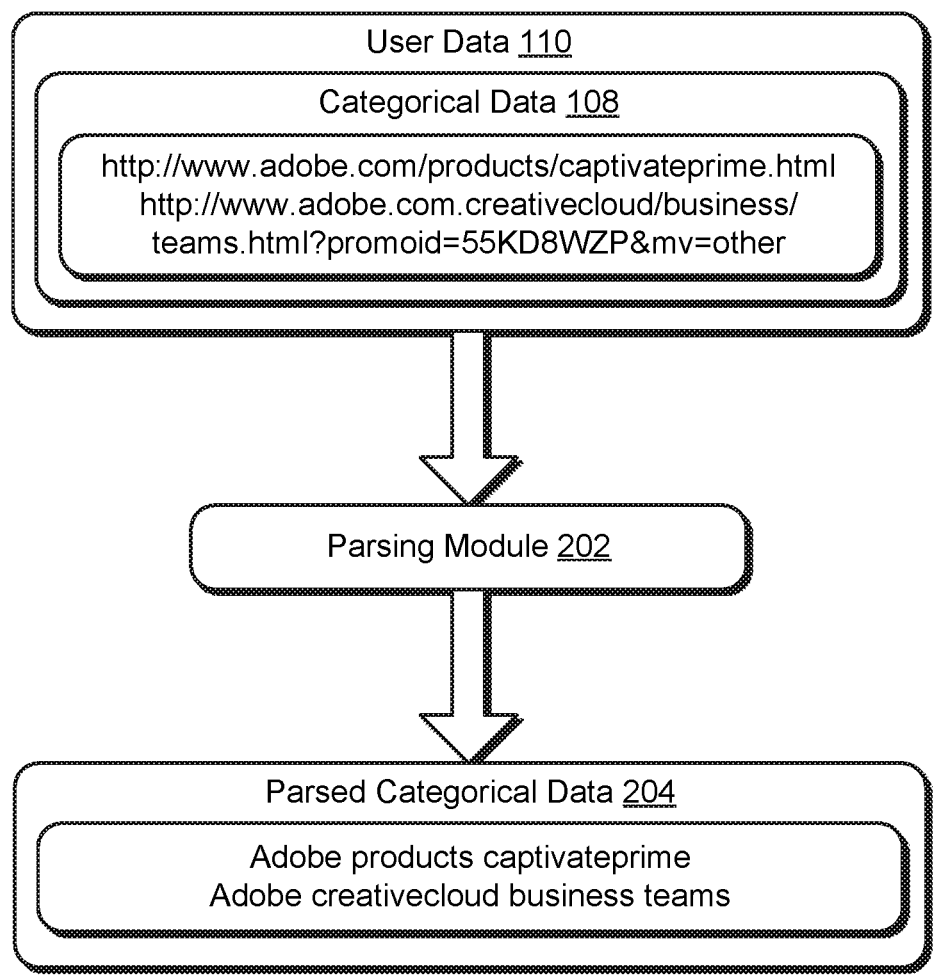
FIGS. 3 and 4 depict systems in an example implementation showing operation of a parsing module of FIG. 2 in greater detail.
Figure 4:
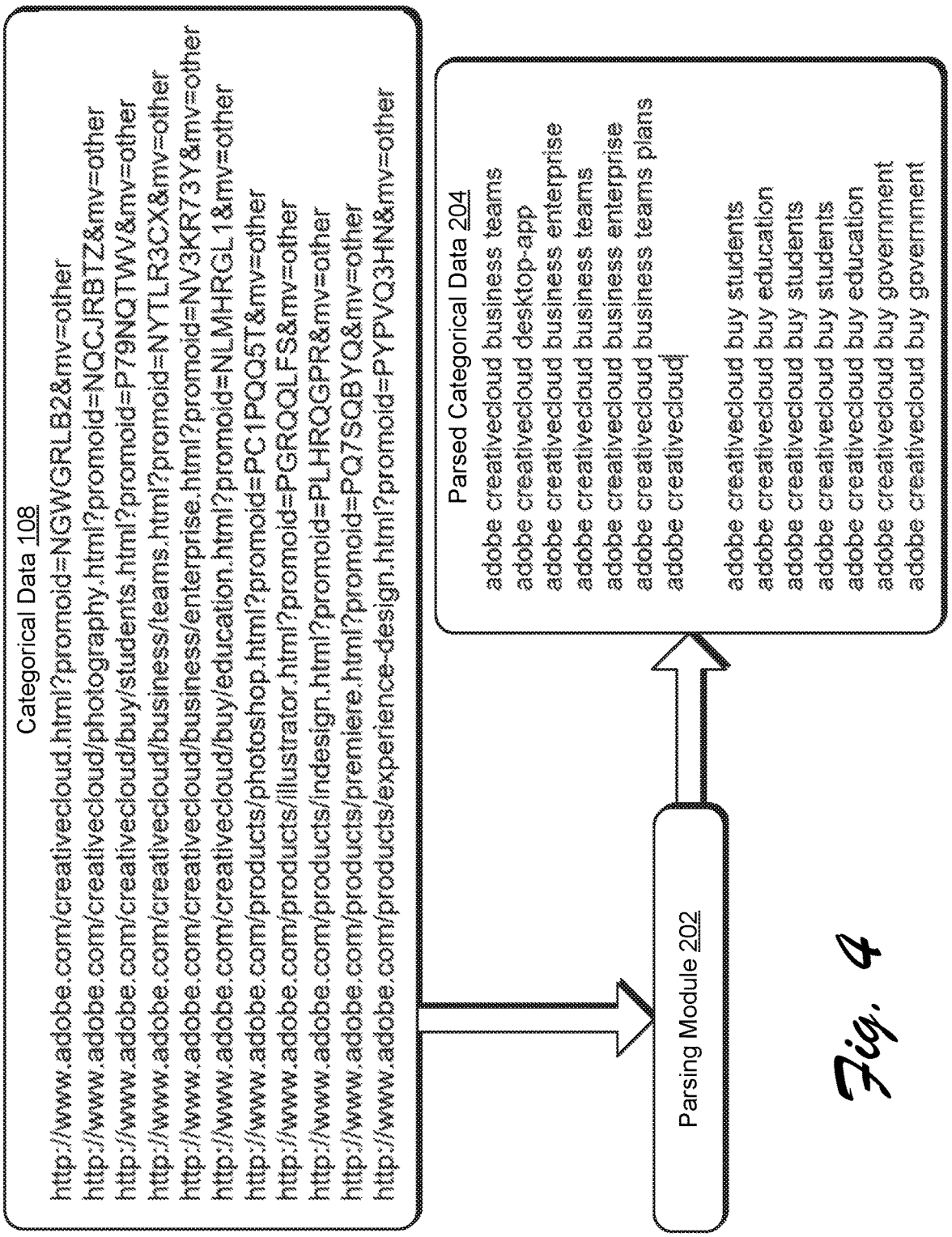
Figure 5:
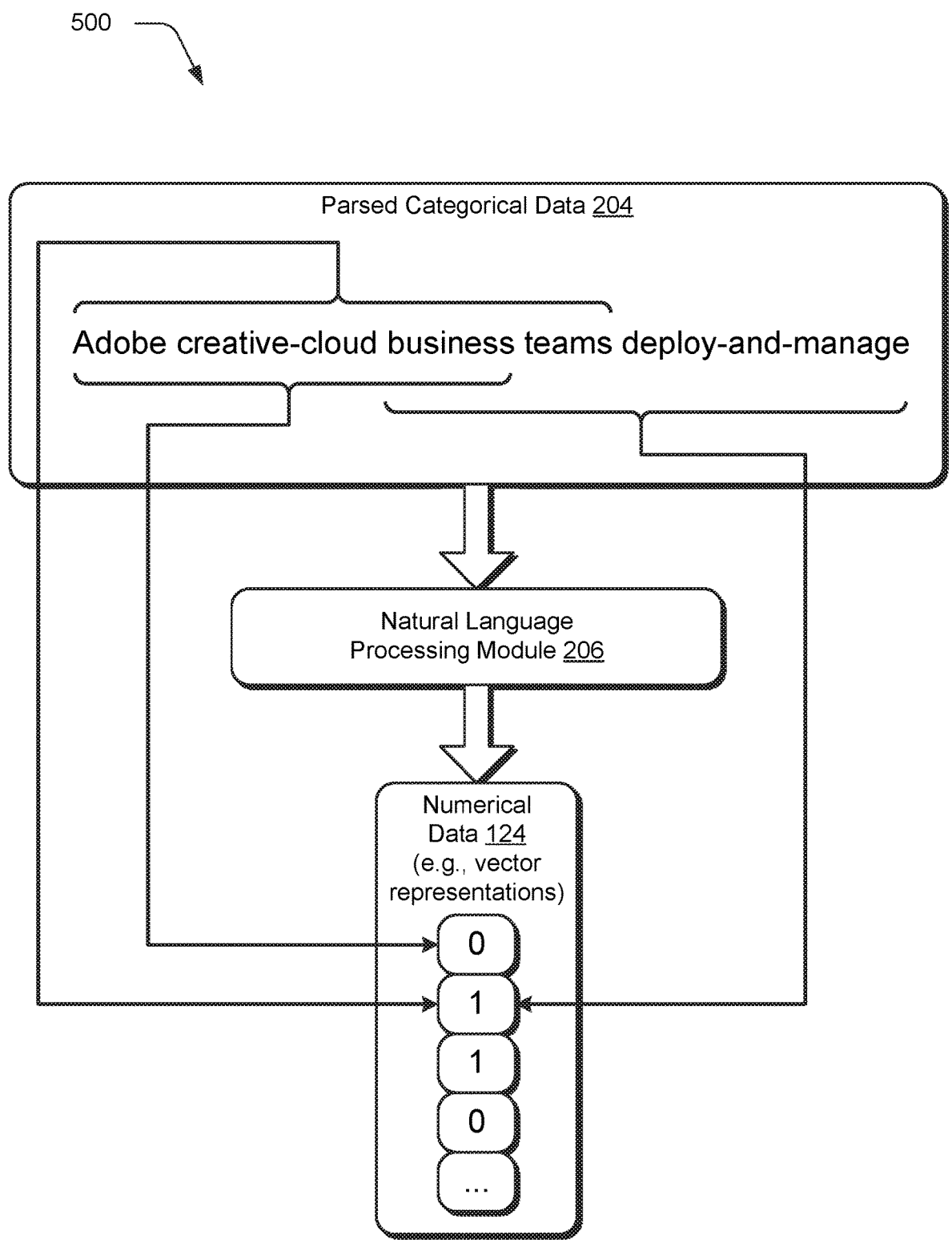
FIG. 5 depicts a system in an example implementation showing operation of a natural language processing module of FIG. 2 in greater detail as generating numerical data from categorical data.
Figure 6:
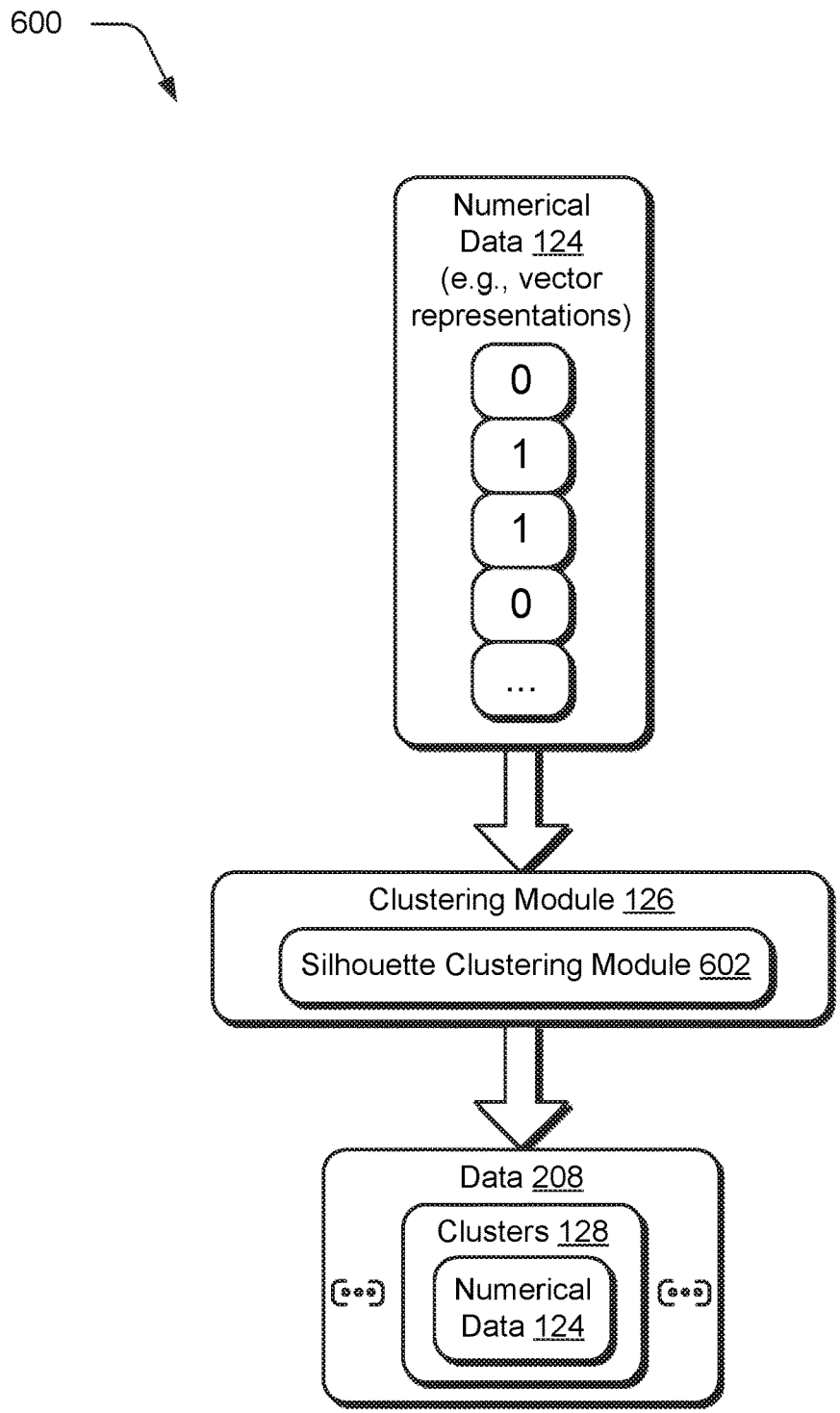
FIG. 6 depicts a system in an example implementation showing operation of a clustering module of FIG. 2 in greater detail as clustering the numerical data of FIG. 5.
Figure 8:
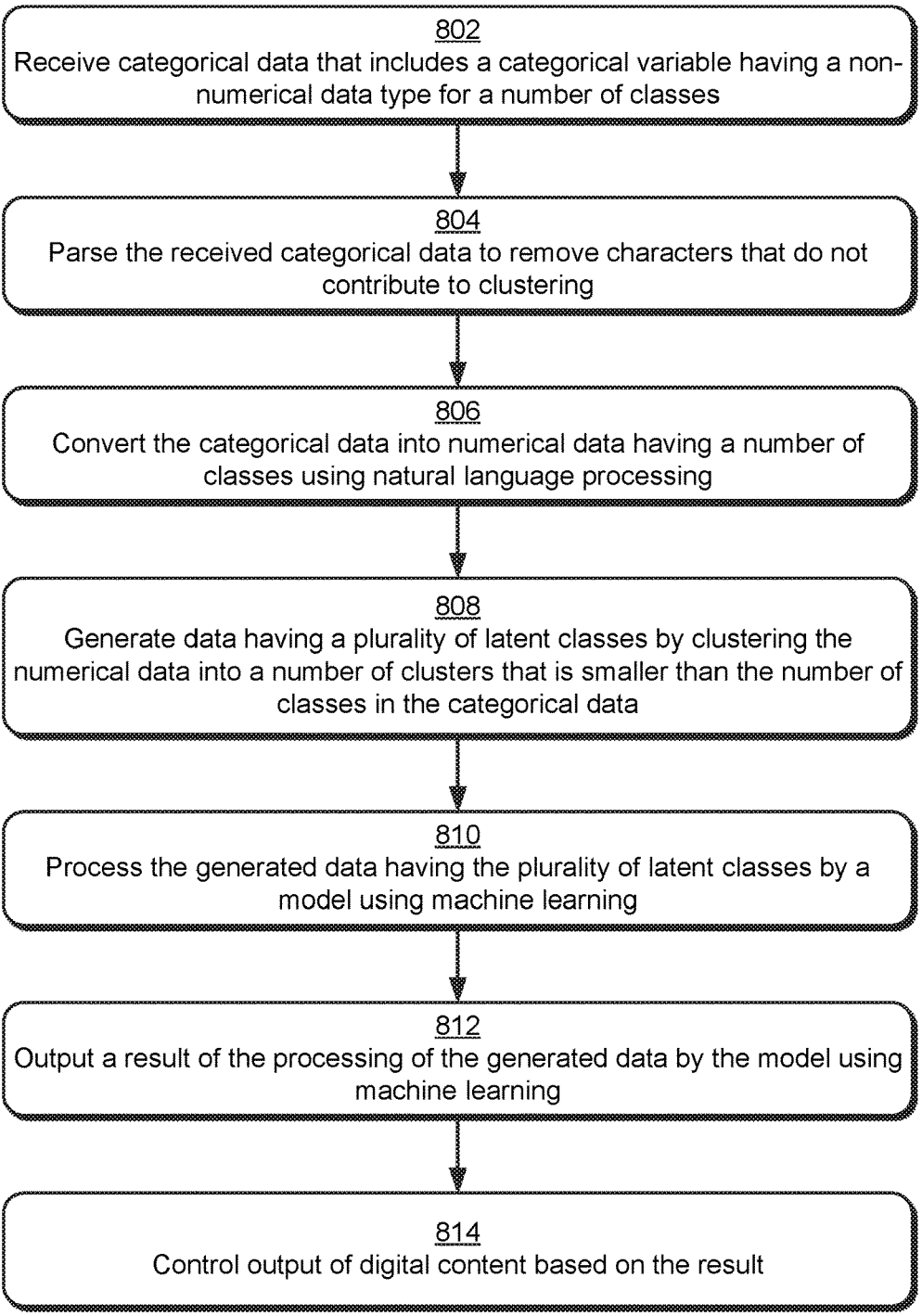
FIG. 8 is a flow diagram depicting a procedure in an example implementation in which categorical data is parsed, converted to numerical data using natural language processing and clustering and then processed using machine learning to control output of digital content.

FIG. 2 depicts a system 200 in an example implementation showing operation of the data transformation module 122 and clustering module 126 of FIG. 1 to process categorical data into a form that is acceptable for machine learning. FIGS. 3 and 4 depict systems 300, 400 in an example implementation showing operation of a parsing module of FIG. 2 in greater detail. FIG. 5 depicts a system 500 in an example implementation showing operation of a natural language processing module of FIG. 2 in greater detail as generating numerical data from categorical data. FIG. 6 depicts a system 600 in an example implementation showing operation of a clustering module of FIG. 2 in greater detail as generating latent classes by clustering the numerical data of FIG. 5. FIG. 7 depicts examples 700 of clusters formed based on the numerical data of FIG. 6. FIG. 8 depicts a procedure 800 in an example implementation in which categorical data is parsed, converted to numerical data using natural language processing, clustered to form latent classes, and the latent classes are then processed using machine learning to control output of digital content.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 1-8.

To begin, categorical data 108 is received by the service provider system 102 that includes a categorical variable having a non-numerical data type for a number of classes (block 802). The categorical data 108, for instance, includes alphabetical characters and may also include numeric characters in addition to the alphabetic characters, i.e., is not limited to exclusive use of alphabetical characters. An example of this is a categorical variable "Last URL visited by a user" which may involve both alphabetical and numerical characters as part of user data 110 as follows:
"http://www.adobe.com.creativecloud/business/
teams.html?promoid=55KD8WZP &mv=other"

The data transformation module 122 is configured to transform the categorical data 108 into a form that is acceptable by the machine learning module 118 and yet also includes useful information that increases accuracy of the machine learning module 118 and corresponding model 120 as opposed to conventional techniques. As previously described, a categorical variable that includes more than ten classes (i.e., unique values for the variable) has been found in practice to cause machine learning models to not function properly due to the curse of dimensionality, resulting from creating a large number of new dummy variable when transforming the categorical variables to numerical ones, which may introduce errors based on random chance and noise. Accordingly, the data transformation module 122 is configured to generate latent classes by forming clusters 128 of numerical data 124 to maintain useful information in a form that is acceptable by the machine learning module 118 to train and use the model 120, e.g., less than ten latent classes.

URL clustering, as used in this example, illustrates difficulties that may be encountered in transformation of categorical data by the data transformation module 122. The difficulty in this instance is not only a result of a number of classes that may be included for the categorical variable but also due to a lack of information outside of the categorical data 108 about that classes that may give insight into how to form the clusters. Accordingly, natural language processing is used by the data transformation module 122 as further described in the following to produce the information (features) that are used to form the clusters based on semantic similarity of the classes to each other, e.g., through use of n-grams. Further, this may be performed without any additional information outside of the categorical data 108. Thus, this technique is applicable to a wide range of categorical data because this technique does not rely on outside sources of data to form the clusters.

To do so, the data transformation module 122 first employs a parsing module 202 to parse the categorical data 108 to remove characters that do not contribute to clustering (block 804). This improves operational efficiency and accuracy of the computing device to perform clustering. In the URL example illustrated in FIGS. 3 and 4, for instance, this is used to remove punctuation, common words such as "http" and "www" and in other instances may be used to remove stop words such as "the." The parsed categorical data 204 results in space separated words from the URLs in the illustrated examples.

The parsed categorical data 204 is then converted into numerical data 124 having a number of classes using natural language processing (block 806) by a natural language processing module 206. As shown in FIG. 5, for instance, the natural language processing module 206 generates the numerical data 124 as a vector representation in an "n" dimensional space based on a context of a word in the categorical data 204 as illustrated using the brackets. Thus, the vector representation may form an "n-gram" as a contiguous sequence of "n" items from a given sequence of characters from the parsed categorical data 204. An n-gram of size 1 is referred to as a "unigram," size 2 as a "bigram," size 3 as a trigram," and so on. As a result, the numerical data 124 reduces semantic composition of the parsed categorical data 204 into simpler vector operations, which may then be used to generate the latent classes through clustering as described in greater detail below.

In an implementation, instead of projecting individual words in the parsed categorical data 204, alone, into a vector space to form the vector representations, multiple words are projected together by the natural language processing module 206 into the vector space to form the vector representations of the numerical data 124. As a result, the numerical data 124 may employ both the words as well as a context of the words within the parsed categorical data 204 to represent the categorical data 108 as numerical data 124, thus providing additional information identifying a context of the words within the categorical data 204.

In one example, the natural language processing module 206 employs a tool referred to as "Sally" that is usable by a computing device to map a set of strings to a set of vectors, which is also referred to as embedding. Sally, as implemented by the natural language processing module 206 of the computing device, maps strings of characters into a vector space using a generalized bag-of-words model. The strings are characterized by a set of features in which each of the features is associated with a corresponding dimension in the vector space. Examples of features include bytes, tokens, n-grams of bytes and n-grams of tokens.

As shown in FIG. 5, Sally involves counting the occurrences of the features in each string taken from the parsed categorical data 204 (or directly from the categorical data 108 itself) to generate the vector representations of the numerical data 124 as a sparse vector of count values. The natural language processing module 206 may also normalize the sparse vector (e.g., using L1 or L2 norm) as part of Sally to output the numerical data 124 is a desired format, e.g., plain numerical text. Further discussion of the Sally tool may be found at "www.mlsec.org/sally/" as developed by Konrad Rieck and Christian Wressnegger. In an example, the features that are used for this mapping by the natural language processing module 206 include bi-gram words and tri-gram characters.

Data 208 having a plurality of latent classes is generated from the numerical data 124 by a clustering module 126 by clustering the numerical data 124 into a number of clusters 128 that is smaller than the number of classes in the categorical data 108 (block 808). This clustering may be performed in a variety of ways. Inhere, for clustering the numerical data, K-means model is used and to determine the number of clusters, in addition to clustering validation, silhouette technique have been used. In the illustrated example of FIG. 6, a Silhouette clustering module 602 is employed by the clustering module 126 to implement a Silhouette technique that involves interpretation and validation of consistency within clusters 128 of data 208. The Silhouette technique is usable to determine "how well" each item in the cluster (i.e., items of numerical data 124 such as individual vector representations) fits within the cluster both in relation to that cluster as well as other clusters. Thus, Silhouette is based on a measure of how similar an item in the cluster 128 is to other items in the cluster, which is referred to as cohesion. This is also based on a measure of how dissimilar the item in the cluster 128 is to other items, which is referred to as separation. This may be expressed mathematically as follows:

$$s(i) = \frac{b(i) - a(i)}{\max\{a(i), b(i)\}}$$

In the above expression, the variable "b(i)" denotes a lowest average dissimilarity of data point "i" to any other cluster 128, of which "i" is not a member. The cluster with this lowest average dissimilarity is referred to as a neighboring cluster 128 of "i" because it is the next best fit cluster for item "i". For "s(i)" to be close to one, "a(i)«b(i)", as "a(i)" is a measure of how dissimilar "i" is to its own cluster, with a small value indicative of a good match. Furthermore, a large value of "b(i)" implies that "i" is badly matched to its neighboring cluster 128. Thus, a value of "s(i)" that is close to one means that the data 208 is accurately clustered. On the other hand, if "s(i)" is close to negative one, then "i" is to be clustered in a neighboring cluster. A value of "s(i)" that is near zero means that the value is disposed on a border between two clusters 128.

An average value of "s(i)" over each of the items in the cluster 128 is a measure of how tightly grouped the items are in relation to each other, and thus accuracy of the clustering. If there are too many or too few clusters, such as in an instance in which a value chosen for "k" in k-means clustering is chosen, some clusters may display narrower silhouettes, when graphically plotted, than silhouettes of other clusters. Thus, silhouette plots and averages may be used to determine a number of clusters within the data 208 that is appropriate by the clustering module 126. The optimal number of clusters determined by Silhouette method is used for K-means clustering. Then, each cluster represent a new numerical variable. These new numerical variables (one for each cluster) represent the categorical variable with all its classes or categories. They are then used in the original data set, replacing the categorical variables, alongside the other numerical variables of the data set. Other clustering techniques are also contemplated, such as Hierarchical clustering or Fuzzy clustering.

Thus, by converting the categorical data 108 into numerical data 124 using natural language processing and then clustering the numerical data, the clusters 128 form a number of latent classes that is smaller than the number of classes in the categorical data 108. This number of latent classes, however, still conveys information form the categorical data 108 that is useful as part of machine learning, as opposed to sparse data of conventional conversion techniques that has limited utility due to errors introduce by noise and random chance, due to the curse of dimensionality resulting from the creation of large number of new dummy variables when converting categorical variables to numerical ones using conventional methods. Accordingly, the data 208 generated by the data transformation module 122 is in a form that is acceptable for processing by the machine learning module 118 and corresponding model 120. Examples 700 of latent classes formed from clustering, as converted back to alphabetic text, are illustrated in FIG. 7.

Returning back to FIG. 2, the generated data 208 having the plurality of latent classes is processed by a model 120 using machine learning (block 810) by the machine learning module 118. This may be used to train the model or to process data using a trained model 120, e.g., to control output of digital content 112. As previously described, the model 120 refers to a computer representation that can be tuned (e.g., trained) by the machine learning module 118 based on inputs to approximate unknown functions. The model 120, for instance, may utilize machine learning to learn from, and make predictions on, training data by analyzing the training data to learn to generate outputs that reflect patterns and attributes of the training data. Examples of machine learning include, but are not limited to, support vector machines, linear regression, logistic regression, dimensionality reduction algorithms, artificial neural networks, deep learning, Poisson regression, linear discriminant analysis (LDA), and so forth. Thus, a machine-learning model makes high-level abstractions in data by generating data-driven predictions or decisions.

To train the model 120, for instance the machine learning module 118 first obtains training data that mimics data to be subsequently processed to perform an action as well as a corresponding "correct" training output. The machine learning module 118, for instance, may employ the model 120 to make training predictions based on the training data to identify and analyze various features (at different levels of abstraction) within the training data.

By analyzing features of the training data (e.g., at various levels of abstraction or depths within levels of a neural network) the machine learning module 118 may generate predictions. To verify accuracy of the predictions, the machine learning module 118 compares data that describes a "correct" output received as part of the training data with the generated predictions. A difference between the "correct" output and the generated prediction is then determined by utilized a loss function 210 to determine a measure of loss, i.e., a measure of difference, such as mean squared error or mean absolute loss. Accordingly, the loss function 210 is used to determine a measure of divergence of the prediction from a desired result. A result from the loss function 210 is then used to train the model 120, such as to correct parameters (e.g., weights) that caused the predicted result to diverge from the actual result to modify one or more functions or parameters. Specifically, the machine learning module 118 modifies one or more functions or parameters of the model 120 to minimize the loss function 210 and reduce the differences between the predictions and the correct output as specified by the training data. By minimizing the loss function 210, the machine learning module 118 improves the accuracy of the model 120 over a number of training samples.

Once trained, the model 120 may then be used to process subsequent data to cause output of a result of the processing of the latent classes by the model using machine learning (block 812). The result, for instance, may be used to control output of digital content based on the result (block 814) by the digital content control module 114. In a digital marketing scenario, for instance, digital marketing content is provided to the client devices 104 in order to increase a likelihood that users of the client devices 104 will interact with the content or another item of digital marketing content toward purchase of a product or service, which is also referred to as conversion.

In one example of use of digital marketing content and conversion, a user may navigate through webpages of a website of a service provider. During this navigation, the user of the client device 104 is exposed to advertisements relating to the good or service. If the advertisements are of interest to the user of the client device 104, the user may select the advertisement via the client device 104 to navigate to webpages that contain more information about the product or service that is a subject of the advertisement, functionality usable to purchase the good or service, and so forth. Each of these selections thus involves conversion of interaction of the user with respective digital marketing content into other interactions with other digital marketing content and/or even purchase of the good or service. Thus, configuration of the advertisements in a manner that is likely to be of interest to the users increases the likelihood of conversion of the users regarding the product or service. Other examples are also contemplated, such as to form recommendations, guide navigation, and so forth.

Example System and Device

Figure 9:
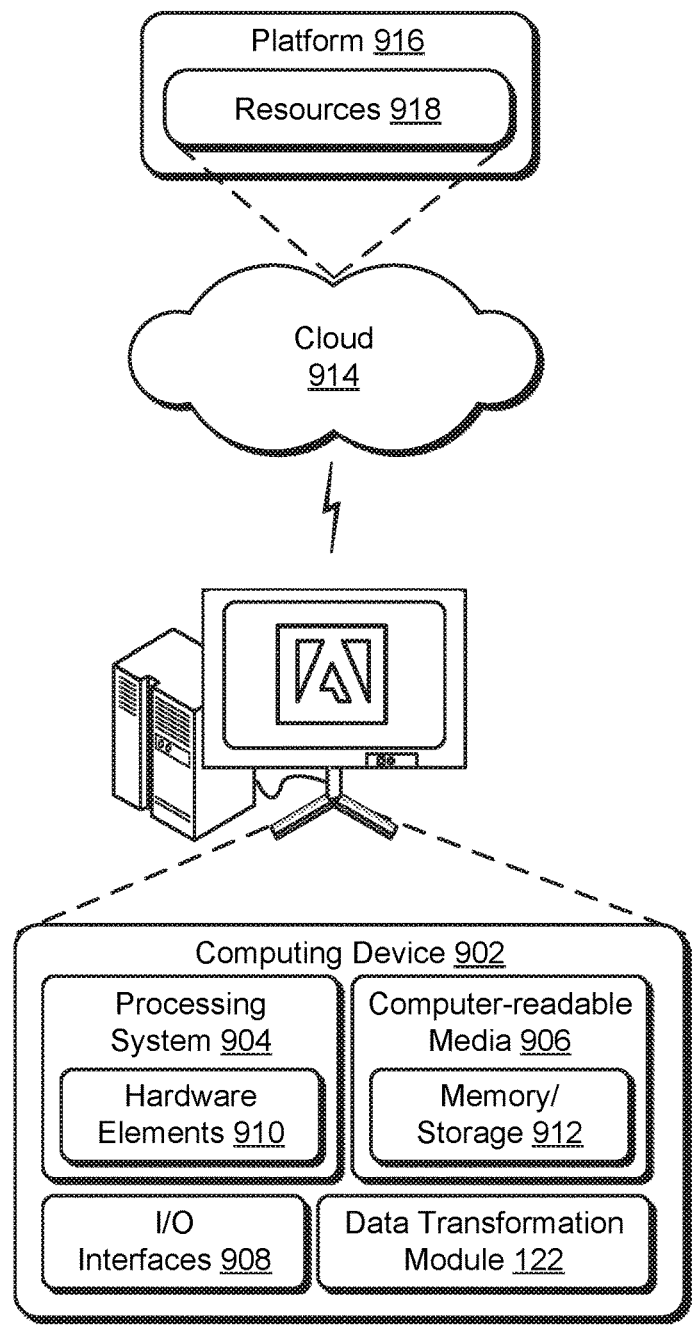
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the data transformation module 122. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a plurality of categorical variables that, respectively, have a number of classes that are non-numerical;
   responsive to determining, by the computing device, the number of classes in a first said categorical variable is less than a number, generating a first set of training data by converting the first said categorical variable into numerical data using natural language processing;
   responsive to determining, by the computing device, the number of classes in a second said categorical variable is greater than the number, generating a second set of training data by:
      converting the second said categorical variable into numerical data as vector representations using natural language processing;
      generating a plurality of latent classes by clustering the vector representations of the numerical data from the second said categorical variable into a number of clusters having semantically similar said vector representations;
   training, by the computing device, a model using machine learning based on:
      the first set of training data including the numerical data converted from the first said categorical variable that have the number of classes that is less than the number; and
      the second set of training data including the plurality of latent classes formed by clustering the numerical data from the second said categorical variables that have the number of classes that is greater than the number;
   processing, by the computing device,
   data having the plurality of categorical variables using the trained model.

2. The method as described in claim 1, wherein the converting includes converting the second said categorical variable into the numerical data into n-gram vector representations.

3. The method as described in claim 1, wherein the vector representations represents multiple words.

4. The method as described in claim 1, wherein the clustering is based on features included in a set of strings of alphabetical text.

5. The method as described in claim 4, wherein the features include bi-gram words and tri-gram characters.

6. The method as described in claim 1, wherein the clustering uses a K-means clustering technique.

7. The method as described in claim 1, wherein the clustering uses a Silhouette clustering technique based on a measure of:
   cohesion indicating how similar numerical values, of the numerical data, are to each other within a respective said cluster; and
   separation indicating how dissimilar numerical values, of the numerical data, are to at least one other said cluster.

8. The method as described in claim 1, wherein the number is ten or more.

9. The method as described in claim 1, wherein the second said categorical variable includes URLs.

10. The method as described in claim 1, further comprising parsing the second said categorical variable and the converting is based on the parsed categorical variable.

11. The method as described in claim 10, wherein the parsing includes removing characters from that include punctuation and stop words.

12. A computing device comprising:
   a processing system; and
   a computer-readable storage medium storing instructions that, responsive to execution by the processing system, configures the processing system to perform operations comprising:
      receiving a plurality of categorical variables that have, respectively a number of classes that are non-numerical;
      responsive to determining that the number of classes in a first said categorical variable is less than a number, converting the first said categorical variable into numerical data using natural language processing to form a first set of training data;
      responsive to determining that the number of classes in a second said categorical variable is greater than the number, generating a second set of training data by:
         converting the second said categorical variable into numerical data using natural language processing; and
         generating a plurality of latent classes by clustering the numerical data of the second said categorical variable into a number of clusters that is smaller than the number of classes to form a second set of the training data;
      training a model using machine learning using:
         the first set of training data including the numerical data converted from the first said categorical variable that have the number of classes that is less than the number; and
         the second set of training data including the plurality of latent classes formed by clustering the numerical data from the second said categorical variable that have the number of classes that is greater than the number; and
      processing the plurality of categorical variables in subsequent data using the trained model.

13. The computing device as described in claim 12, the operations further comprising parsing the second said categorical variable to remove characters that do not contribute to the clustering.

14. The computing device as described in claim 12, wherein the numerical data is configured as vector representations.

15. The computing device as described in claim 14, wherein characters in the plurality of categorical variables are converted into the vector representations.

16. The computing device as described in claim 12, wherein the clustering is based on a measure of:
   cohesion indicating how similar numerical values, of the numerical data, are to each other within a respective said cluster; and
   separation indicating how dissimilar numerical values, of the numerical data, are to at least one other said cluster.

17. The computing device as described in claim 12, wherein the number has been found to produce results having limited accuracy.

18. One or more computer readable storage media storing instructions that, responsive to execution by a processing system, causes the processing system to perform operations comprising:

receiving a plurality of categorical variables having, respectively, a non-numerical data type having a number of classes;

responsive to determining that the number of classes in a first said categorical variable is less than a number, converting the first said categorical variable into numerical data using natural language processing to form a first set of training data;

responsive to determining that the number of classes in a second said categorical variable is greater than the number, generating a second set of training data by:

converting the second said categorical variable into numerical data using natural language processing; and generating a plurality of latent classes by clustering the numerical data from the second said categorical variable into a number of clusters that is smaller than the number of classes to form the second set of training data;

training a model using machine learning using:

the first set of training data including the numerical data converted from the first said categorical variable that has the number of classes that is less than the number; and the second set of training data including the plurality of latent classes formed by clustering the numerical data from the second said categorical variable that have the number of classes that is greater than the number; and processing subsequent data using the trained model.

19. The one or more computer readable storage media as described in claim 18, wherein the converting includes converting the second said categorical variable into the numerical data as vector representations of the number of classes.

20. The one or more computer readable storage media as described in claim 18, further comprising parsing the second said categorical variable to remove characters that do not contribute to clustering.

* * * * *